(12) United States Patent
Chu et al.

(10) Patent No.: US 7,908,380 B1
(45) Date of Patent: Mar. 15, 2011

(54) METHOD OF SESSION QUOTA CONSTRAINT ENFORCEMENT

(75) Inventors: Ching-Wen Chu, Santa Clara, CA (US); Rajeev Angal, Santa Clara, CA (US); Subash Penumatsa, Santa Clara, CA (US); Beomsuk Kim, Santa Clara, CA (US); Anant D. Kadam, Santa Clara, CA (US); Ajay Sondhi, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1015 days.

(21) Appl. No.: 11/410,677

(22) Filed: Apr. 24, 2006

(51) Int. Cl.
*G06F 15/16* (2006.01)
(52) U.S. Cl. ........ 709/227; 709/222; 709/228; 709/249; 713/185; 726/8
(58) Field of Classification Search .................. 709/227, 709/228, 222, 249; 713/184, 185; 726/8; 370/254, 469
See application file for complete search history.

(56) References Cited

U.S. PATENT DOCUMENTS

| | | | | |
|---|---|---|---|---|
| 7,290,288 B2* | 10/2007 | Gregg et al. | ................ | 726/28 |
| 7,308,502 B2* | 12/2007 | Rouault | ................ | 709/229 |
| 7,469,279 B1* | 12/2008 | Stamler et al. | ................ | 709/221 |
| 7,698,398 B1* | 4/2010 | Lai | ................ | 709/223 |
| 2002/0019873 A1* | 2/2002 | Goldszmidt et al. | ................ | 709/228 |
| 2003/0023711 A1* | 1/2003 | Parmar et al. | ................ | 709/223 |
| 2006/0015416 A1* | 1/2006 | Hoffman et al. | ................ | 705/28 |
| 2006/0218629 A1* | 9/2006 | Pearson et al. | ................ | 726/8 |
| 2007/0192326 A1* | 8/2007 | Angal et al. | ................ | 707/10 |
| 2009/0059957 A1* | 3/2009 | Bagepalli et al. | ................ | 370/469 |
| 2009/0292927 A1* | 11/2009 | Wenzel et al. | ................ | 713/185 |

OTHER PUBLICATIONS

The Kerberos Network Authentication Service (V5) RFC 1510 J. Kohl, C. Neuman Internet Engineering Task Force, Sep. 1993.*

* cited by examiner

*Primary Examiner* — Thu Ha T Nguyen
(74) *Attorney, Agent, or Firm* — Martine Penilla & Gencarella, LLP

(57) ABSTRACT

A method to limit active sessions connecting user access to a computer network is presented. First, a request to initiate a new user session in the computer network is authenticated. The authentication is operatively conducted within a single sign-on provider. A session quota is then determined through a session quota logic of the single sign-on provider with the session quota logic retrieving a stored session quota. Then the number of active sessions is compared with the determined session quota. The determined session quota is enforced though a session quota enforcement logic of the SSO provider.

20 Claims, 5 Drawing Sheets

METHOD OF SESSION QUOTA CONSTRAINT ENFORCEMENT

BACKGROUND

Websites frequently are designed to grant user access to service applications. However, because sensitive data is often accessible through these types of applications, it is common practice to require an individual to authenticate their identity before granting access to sensitive data. Typically, this involves compelling the submission of a name and a password. This security requirement can create a problem if there are multiple services within an enterprise and each service requires a separate authentication. Repeated requests to provide authentication once a user's identity has been established will frustrate typical individuals and discourage them from using an application system. Therefore, it is sometimes desirable to configure applications within an enterprise so that an individual is only asked to authenticate once during a session. This configuration is commonly known as single sign-on (SSO).

FIG. 1 is a high level diagram illustrating a prior art SSO computer system 100. A session is initiated at a time t1 when an individual logs into application 104 with a client browser 102 by providing a name and password. Application 104, in this example, is a paycheck application but it is easily understood to be any application providing a service and configured to permit single sign-on. After the individual has submitted a name and password, their identity will be authenticated through an authentication mechanism according to the system design. FIG. 1 illustrates usernames and passwords being stored in LDAP server 108. Once authentication is complete, the SSO computer system 100 will generate a session cookie 110 which contains session token information.

After session cookie 110 has been provided to the browser 102, information contained within session cookie 110 is sent through browser 102 whenever requests are made to access other applications in SSO computer system 100 throughout the session. For example, during the session that was initiated at time t1 but at a later time t2, the individual may wish to access application 106. Because SSO computer system 100 is configured for single sign-on and information from session cookie 110 is sent with the access request, the individual is able to gain access to application 106 without having to provide a name and password. After the session is ended by logging out of SSO computer system 100, session information for the individual will be cleared and session cookie 110 will eventually be removed from the individual's computer.

A problem associated with SSO computer system 100 occurs when individuals are allowed to create an unlimited number of active sessions. If every person is allowed to have unlimited number of simultaneous, active sessions in a network, a session table may become filled with entries to the point where other individuals can not log into applications. The saturation of a session table may be the result of computer users failing to log out of large numbers of sessions or it could be an indication of a malicious attack on an internet service with stolen user credentials. Therefore, there is a need for a method which allows enterprise systems to limit the number of simultaneous sessions that a person may have active. However, the method should be capable of operating in an SSO-configured network and should be flexible enough so that session quotas can be tailored to the needs of an enterprise with a minimum of administrative overhead.

SUMMARY

Embodiments of the present invention provide a method to limit active sessions connecting user access to a computer network. Session quota enforcement rules are used to tailor the enforcement of session quotas on the computer network. A configurable framework is provided which defines the list of attributes that can be used to create session quota enforcement rules.

It should be appreciated that the present invention can be implemented in numerous ways, such as a process, an apparatus, a system, a device or a method on a computer readable medium. Several inventive embodiments of the present invention are described below.

In one embodiment, a request to initiate a new user session in a computer network is authenticated. The authentication is operatively conducted within a single sign-on (SSO) provider. A session quota is then determined through a session quota logic of the SSO provider. The session quota logic retrieves a stored session quota. The number of active session is compared with the determined session quota. Finally, the determined session quota is enforced through a session quota enforcement logic of the SSO provider.

In another embodiment, a request to initiate a new user session in a computer network is authenticated. The authentication is operatively conducted within an SSO provider which is accessed through a load balancer. Then, a session quota is determined through a session quota logic of the SSO provider. The session quota logic retrieves a stored session quota. The number of active sessions is compared with the determined session quota. Finally, the determined session quota is enforced through the session quota enforcement logic of the SSO provider. The session quota enforcement logic accesses both an internal session table of the SSO provider and session tables internally contained in a plurality of SSO providers cooperatively operating within the computer network.

In yet another embodiment, a request to initiate a new user session in a computer network is authenticated. The authentication is operatively conducted within an SSO provider which is accessed through a load balancer. Then, a session quota is determined through a session quota logic of the SSO provider. The session quota logic retrieves a stored session quota. The number of active sessions is compared with the determined session quota. Finally, the determined session quota is enforced through a session quota enforcement logic of the SSO provider. The session quota enforcement logic accesses a shared session repository which maintains session information for a plurality of SSO providers cooperatively operating within the computer network.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The present invention relates to limiting active sessions connecting user access to a computer network. The method operates cooperatively with a system managing single sign-on functionality, called an SSO provider, and allows a system administrator to assign session quota priorities. The method also allows an administrator to specify the manner in which session quotas are enforced based on session quota enforcement rules. Session quota enforcement rules determine how an SSO provider will respond to requests to initiate new active sessions if a session quota is exhausted.

It will be obvious, however, to one skilled in the art, that the present invention may be practiced without some or all of these specific details. In other instances, well known process operations have not been described in detail in order not to unnecessarily obscure the present invention.

Figure 1:
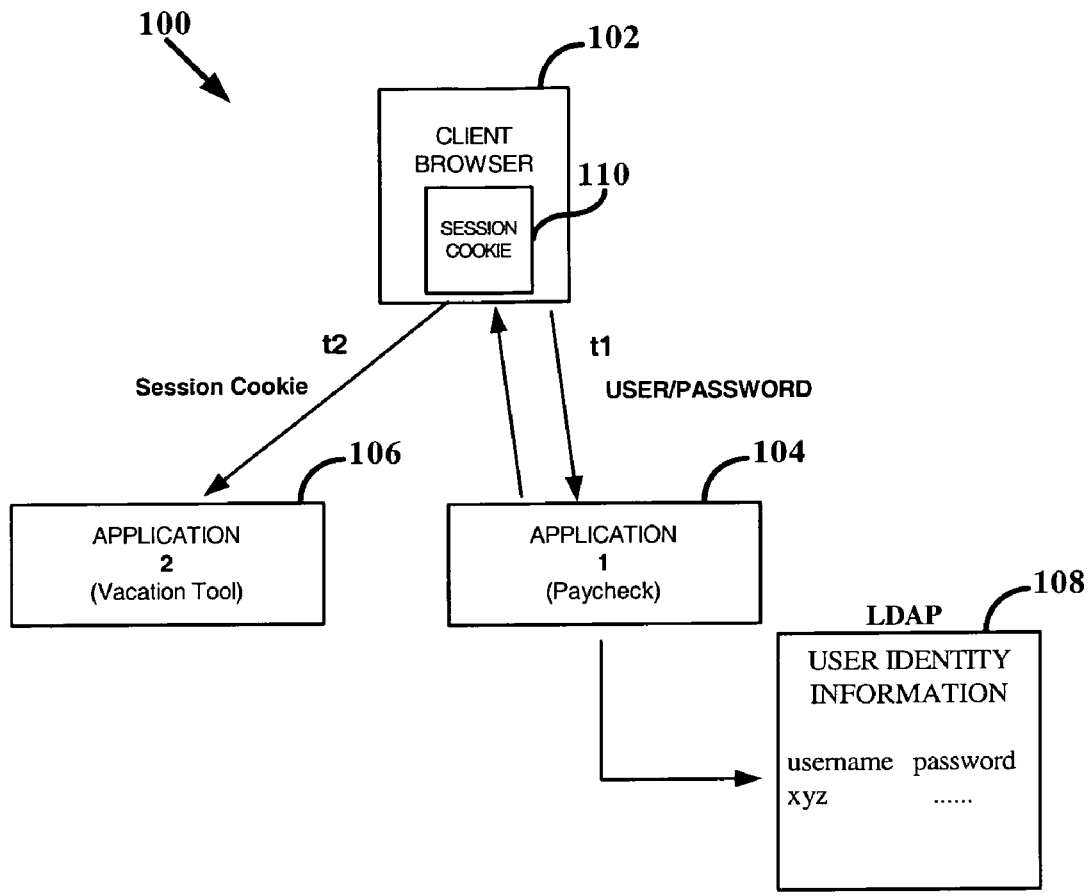
FIG. 1 is a high level diagram illustrating a prior art SSO computer system.
Figure 2A:
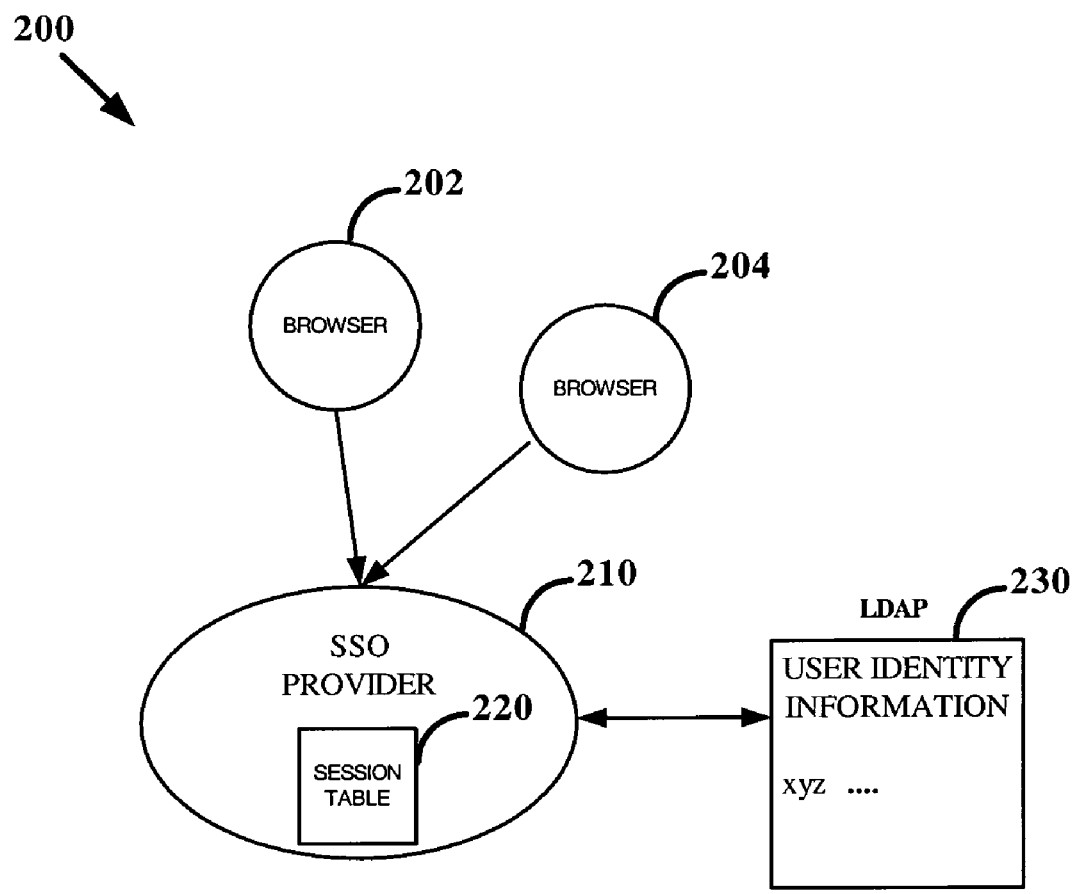
FIG. 2A is a conceptual block diagram of an SSO computer system, in accordance with one embodiment of the present invention.

FIG. 2A is a conceptual block diagram of an SSO computer system 200 in accordance with one embodiment of the present invention. In FIG. 2A, multiple browsers are shown requesting to initiate new user sessions through SSO provider 210. SSO provider 210 is capable of providing single sign-on management for multiple applications within a computer network. SSO provider 210 may reside in an individual server computer or may be one of a number of services hosted by a server computer. In normal operation, SSO provider 210 accesses an internal session table 220 which maintains session information for the applications which are single sign-on enabled. The session table contains information related to session quotas for a user as well as an active listing of sessions which a user has active. During authentication operations, SSO provider 210 accesses user identity information stored on LDAP service 230. User identity information stored in LDAP service 230 is particular to the authentication mechanism employed by SSO computer system 200. For instance user identity information may be a user name and password, biometric identification information, or authenticating token information. User identity information also includes session quotas that are assigned to individuals. As will be discussed later with the session quota logic, an individual may be assigned multiple session quotas with the quotas stored in a hierarchical data structure. Although FIG. 2A illustrates user identity information being hosted on an LDAP service, it is understood that any suitable computer service could host user identity information either on a separate server of the same server hosting SSO provider 210.

Figure 2B:
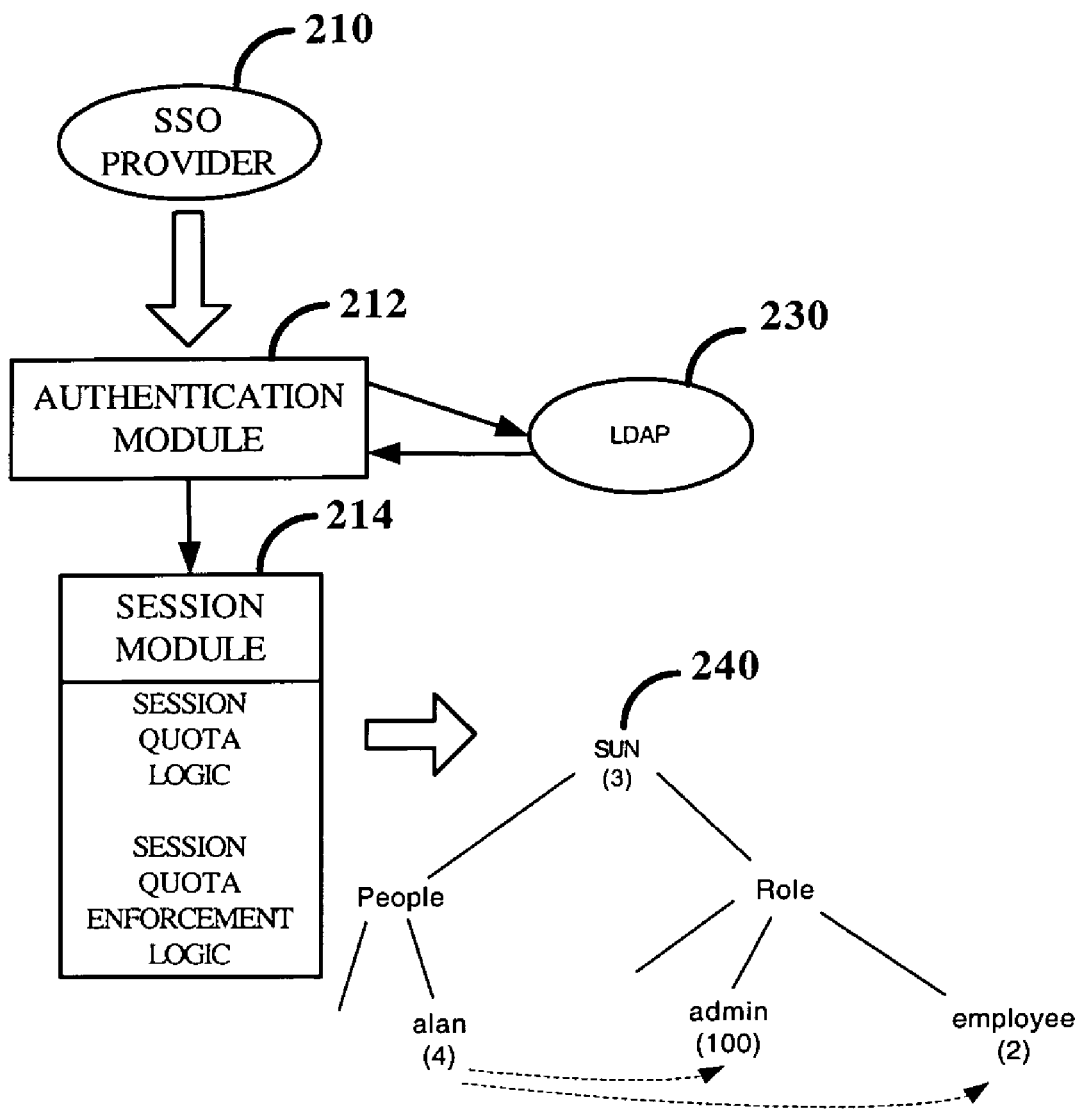
FIG. 2B is a block diagram providing further details of an SSO provider, in accordance with one embodiment of the present invention.

FIG. 2B is a block diagram providing further details of an SSO provider in accordance with one embodiment of the present invention. SSO provider 210 comprises an authentication module 212 and a session module 214. Authentication module 212 contains logic to authenticate user credentials to initiate single sign-on. Authentication module 212 is adaptable to the authenticating mechanism employed to authenticate users before access is granted to a computer system. For instance an authenticating mechanism may require an individual to submit a username and password or an authenticating token. Session module 214 provides session quota logic and session quota enforcement logic.

The session quota logic provides a management interface for a system administrator to assign quotas in a hierarchical fashion. Referring back to FIG. 2B, quota hierarchy 240 illustrates one example in which a plurality of session quotas may be organized. As shown in FIG. 2, quota hierarchy 240 is organized to correspond to user/role/org/realm levels. Since quotas are organized in a hierarchical fashion, a binary tree data structure can be used to efficiently store quotas. Organizing quotas in a hierarchical structure also allows a business to flexibly tailor session quota allocations. For instance, an employee may have several attributes which can be considered in assigning a session quota. First, a default number of session quotas may be assigned to all employees. Then, considering a person's job function and the organization to which an individual reports to in a company quotas may be allocated accordingly. In this fashion, should the need arise to change session allocation rules to large groups of individuals, the quota hierarchy allows all persons sharing an attribute to have their session quota allocations changed all at once. In the example shown provided in FIG. 2B, quota hierarchy 240 shows employees of a company are given a default session quota of 3 whereas an individual could be assigned a greater or lesser session quota depending on their identity or their job title.

Because individuals can have multiple session quotas based on their identity and job attributes, the session quota logic also provides a way to assign a priority for the plurality of session quotas. The priority allows the session quota logic to select the highest session quota with the greatest importance as the limit for the number of active sessions connecting user access to the computer network. In addition to assigning quota priorities, the session quota logic may also determine that individuals such as those in the upper administration role should be exempt from session quota checking altogether.

The session quota enforcement logic of session module 214 provides a pluggable framework for administrators to define and configure the desired behavior of the SSO provider when the session quota is exhausted. When enforcing session quotas, the session quota enforcement logic checks timestamps of sessions in a session table and considers only sessions which have not expired and are in the process of being cleaned from the session table. In this fashion, only active sessions are counted against the session quota limit.

The enforcement behavior of the session quota enforcement logic can be customized by a system administrator with session quota enforcement rules. Examples of session quota enforcement rules include rejecting requests to initiate new user sessions until the quota of active sessions is not exhausted. Another behavior can configure the session quota enforcement logic to scan a session table and identify and terminate the oldest active session. The new user session would be activated once the oldest active session was terminated and cleaned from the system. Instead of an oldest active session, another enforcement rule can configure the session quota enforcement logic to identify and terminate a session having the greatest amount of idle time.

The session quota behavior examples given above are illustrative and not meant to be an exhaustive account of all possible session quota behaviors. Session quota enforcement rules can be based on any attribute contained in a session table. The ability to define session quota enforcement rules based on attributes in a session table gives a system administrator superior flexibility in defining how session quotas should be enforced within the SSO system. Table 1 is a representative list of attributes that can be used to create session quota enforcement rules.

TABLE 1

Session Type (User session
or Application session)

maximum session time
maximum idle time
maximum cache time
authentication type
authentication level
customized session property It should be noted that since the session quota enforcement logic provides a configurable framework for administrators, enforcement rules may be configured non-uniformly throughout an SSO computer system. In other words, an administrator may apply different session quota enforcement rules to different individuals. Furthermore, the session quota enforcement logic also permits the definition of multiple session quota enforcement rules to be applied to an individual depending on the type of session initiated by the individual. Therefore, the session quota enforcement logic permits the tailoring of session quota enforcement behavior to match the business needs of an enterprise.

Figure 3:
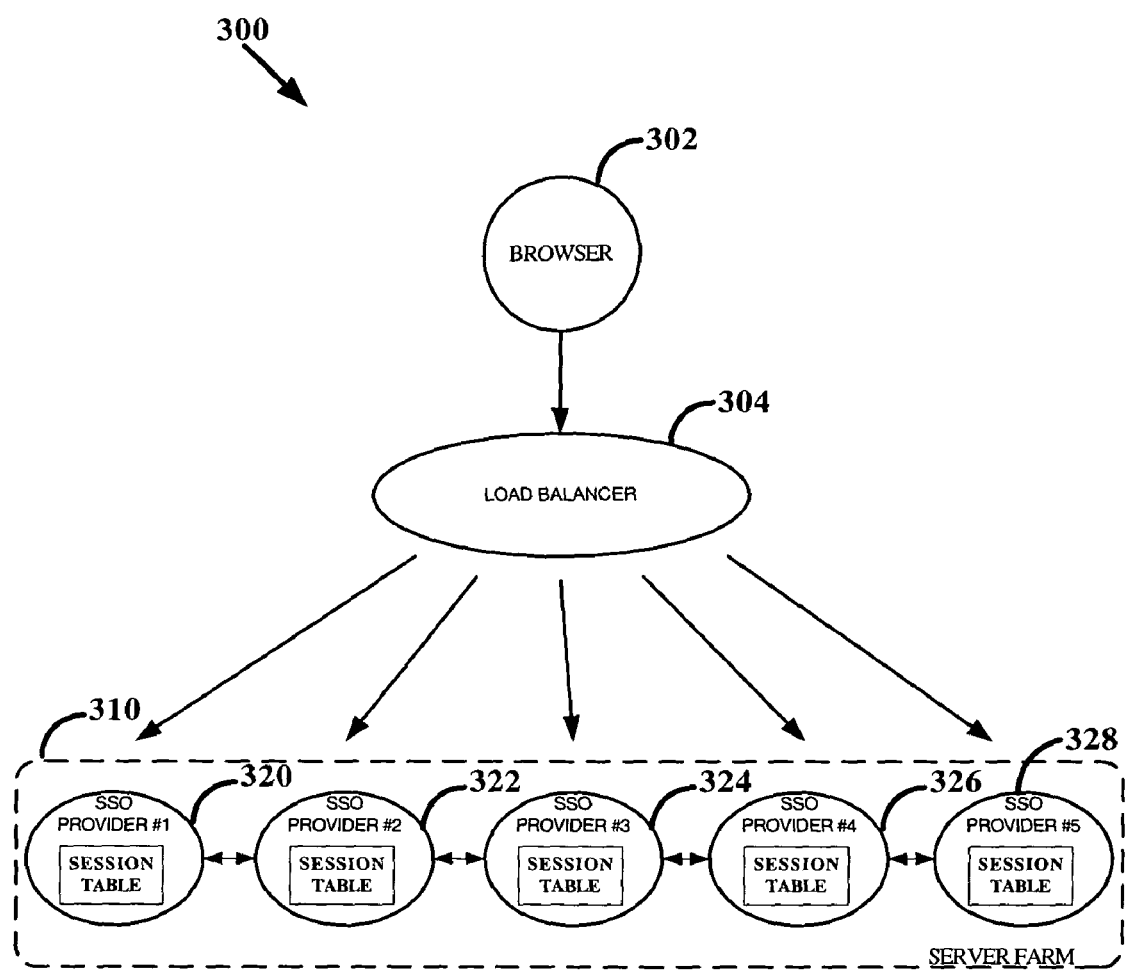
FIG. 3 is a conceptual block diagram of an SSO computer system in a load balanced configuration, in accordance with one embodiment of the present invention.

FIG. 3 is a conceptual block diagram of an SSO computer system 300 in a load balanced configuration, in accordance with one embodiment of the present invention. In SSO computer system 300 a request to initiate a new user session in the computer network is made through browser 302. Although a single browser is shown in FIG. 3, it is easily understood that browser 302 may be one of a plurality of browsers each seeking to initiate a new user session in a computer network. The request is first processed through a load balancer 304 which distributes user session requests among multiple peer SSO providers which may all be located in a server farm 310 as illustrated in FIG. 3 or may be dispersed geographically but all cooperatively networked in a computer network. Although a single load balancer and server farm are illustrated for purposes of clarity, it should be understood that multiple load balancers or server farms could be configured in a network to provide access to large numbers of individuals.

Each SSO provider in SSO computer system 300 contains a session table and communicates with the other peer SSO providers in the network. Because load balancer 304 disperses user sessions among the peer SSO providers, the session table of each peer SSO provider needs to be scanned in order to ascertain the total number of sessions a user has active. Therefore, to enforce a session quota, each SSO provider needs to communicate with its peer SSO provider. The peer SSO providers of server farm 310 can be configured in a star configuration to facilitate the use of multicasting communication. Peer-to-peer communication can be achieved using any suitable variety of communication technology such as XML over HTTP.

Figure 4:
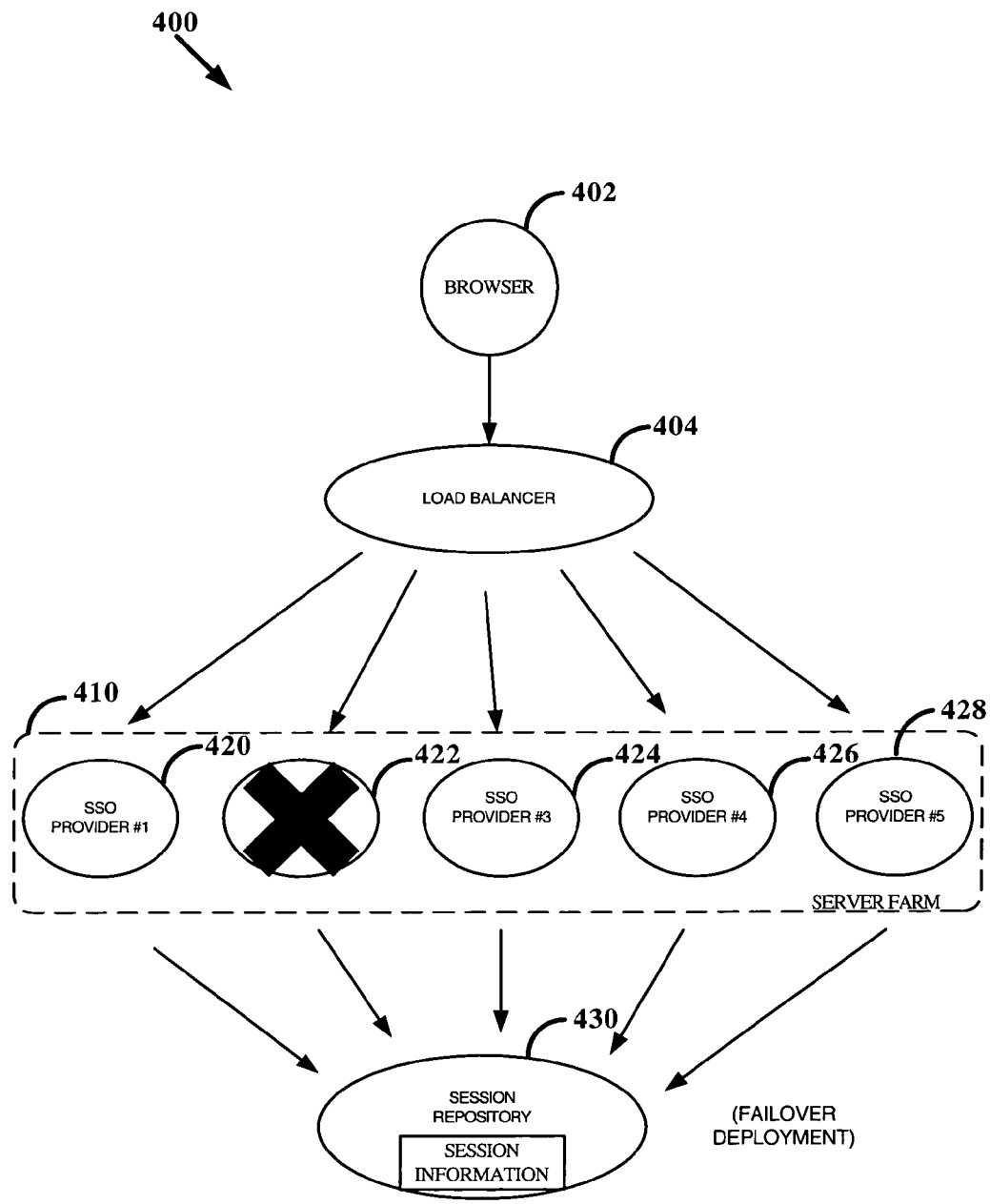
FIG. 4 is a conceptual block diagram of an SSO computer system providing a failover capability, in accordance with one embodiment of the present invention.

FIG. 4 is a conceptual block diagram of an SSO computer system 400 providing a failover capability, in accordance with one embodiment of the present invention. In SSO computer system 400 a request to initiate a new user session in the computer network is made through browser 402. Although a single browser is shown in FIG. 4, it is understood that browser 402 may be one of a plurality of browsers each seeking to initiate a new user session in a computer network. The request is first processed through a load balancer 404 which distributes user session requests among multiple SSO providers which may all be located in a server farm 410 as illustrated in FIG. 4 or may be dispersed geographically but all cooperatively networked in a computer network. As was described in FIG. 3, although a single load balancer and server farm are illustrated multiple load balancers and multiple server farms may be a part of the network of computer system 400.

Each SSO provider in server farm 410 accesses a shared session repository 430. Shared session repository 430 contains session information for all active users sessions in the network that are managed by the SSO providers of server farm 410. Since session repository 430 stores the session information for all SSO providers, this configuration is considered to be a fail-over configuration for providing SSO service. For instance, if SSO provider 422 becomes inoperative, the sessions managed by SSO provider 422 can be redistributed to the remaining SSO providers in server farm 410 without affecting users formerly managed by SSO provider 422.

Because session information is centrally maintained within session repository 430, if session repository 430 becomes inoperative, session information will be inaccessible to all SSO providers of server farm 410. The SSO computer system 400 can be configured to automatically suspend session quota enforcement until session repository 430 is restored. After session repository 430 is restored, the session quota enforcement logic will enforce session quotas based on the enforcement quota rules as before.

An alternative to suspending session quota enforcement if session repository 430 becomes inoperative is that computer system 430 may be configured to revert to the configuration of SSO computer system 300 if session repository 430 becomes inoperative. Session tables will be maintained within each SSO provider and each SSO provider will communicate with its peer SSO providers in server farm 410. In this manner the configuration of SSO computer system 300 provides a fail-over configuration if session repository 430 becomes inoperative.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to limit active sessions connecting user access to a computer network, comprising method operations of:
    authenticating a request to initiate a new user session in the computer network, the authenticating operatively conducted within a single sign-on (SSO) provider;
    determining a session quota through a session quota logic of the SSO provider, the session quota logic retrieving a stored session quota, wherein the stored session quota depends at least in part on a quota hierarchy whose data structure is a binary tree with nodes that include data for one or more personal attributes selected from the group of personal attributes consisting of identity and job title;
    comparing a number of active sessions with the determined session quota; and
    enforcing the determined session quota through a session quota enforcement logic of the SSO provider, wherein each operation of the method is executed by a microprocessor.

2. The method of claim 1, wherein a session quota enforcement rule configures the session quota enforcement logic to scan and terminate active sessions according to the session quota enforcement rule.

3. The method of claim 1, wherein the session quota logic is configurable to assign a priority for a plurality of session quotas, the priority enabling the session quota to be determined from the plurality of session quotas.

4. The method of claim 1, wherein the session quota enforcement logic accesses a session table stored within the SSO provider which maintains session information.

5. The method of claim 2, wherein the session quota enforcement rule configures the session quota enforcement logic to reject requests to initiate new user sessions until the number of active sessions is lower than the determined session quota.

6. The method of claim 2, wherein the session quota enforcement rule configures the session quota enforcement logic to determine and terminate an oldest session.

7. The method of claim 2, wherein the session quota enforcement rule configures the session quota enforcement logic to determine and terminate a session having a greatest amount of idle time.

8. A method to limit active sessions connecting user access to a computer network, comprising method operations of:
    authenticating a request to initiate a new user session in the computer network, the authenticating operatively conducted within a single sign-on (SSO) provider, the SSO provider operatively accessed through a load balancer;
    determining a session quota through a session quota logic of the SSO provider, the session quota logic retrieving a stored session quota, wherein the stored session quota depends at least in part on a quota hierarchy whose data structure is a binary tree with nodes that include data for one or more personal attributes selected from the group of personal attributes consisting of identity and job title;
    comparing a number of active sessions with the determined session quota; and
    enforcing the determined session quota through a session quota enforcement logic of the SSO provider, session quota enforcement logic accessing both an internal session table of the SSO provider and session tables contained in a plurality of SSO providers cooperatively operating within the computer network, wherein each operation of the method is executed by a microprocessor.

9. The method of claim 8, wherein a session quota enforcement rule configures the session quota enforcement logic to scan and terminate active sessions according to the session quota enforcement rule.

10. The method of claim 8, wherein the session quota logic is configurable to assign a priority for a plurality of session quotas, the priority enabling the session quota to be determined from the plurality of session quotas.

11. The method of claim 9, wherein the session quota enforcement rule configures the session quota enforcement logic to reject requests to initiate new user sessions until the number of active sessions is lower than the determined session quota.

12. The method of claim 9, wherein the session quota enforcement rule configures the session quota enforcement logic to determine and terminate an oldest session.

13. The method of claim 9, wherein the session quota enforcement rule configures the session quota enforcement logic to determine and terminate a session having a greatest amount of idle time.

14. A method to limit active sessions connecting a user access to a computer network, comprising method operations of:
    authenticating a request to initiate a new user session in the computer network, the authenticating operatively conducted within a single sign-on (SSO) provider, the SSO provider operatively accessed through a load balancer;
    determining a session quota through a session quota logic of the SSO provider, the session quota logic retrieving a stored session quota, wherein the stored session quota depends at least in part on a quota hierarchy whose data structure is a binary tree with nodes that include data for one or more personal attributes selected from the group of personal attributes consisting of identity and job title;
    comparing a number of active sessions with the determined session quota; and
    enforcing the determined session quota through a session quota enforcement logic of the SSO provider, the session quota enforcement logic accessing a shared session repository, the shared session repository maintaining session information for a plurality of SSO providers cooperatively operating within the computer network, wherein each operation of the method is executed by a microprocessor.

15. The method of claim 14, wherein the SSO provider is one of the plurality of SSO providers and the plurality of SSO providers are capable of compensating for a failure of one or more of the plurality of SSO providers.

16. The method of claim 14, wherein a session quota enforcement rule configures the session quota enforcement logic to scan and terminate active sessions according to the session quota enforcement rule.

17. The method of claim 14, wherein the session quota logic is configurable to assign a priority for a plurality of session quotas, the priority enabling the session quota to be determined from the plurality of session quotas.

18. The method of claim 16, wherein the session quota enforcement rule configures the session quota enforcement logic to reject requests to initiate new user sessions until the number of active sessions is lower than the determined session quota.

19. The method of claim 16, wherein the session quota enforcement rule configures the session quota enforcement logic to determine and terminate an oldest session.

20. The method of claim 16, wherein the session quota enforcement rule configures the session quota enforcement logic to determine and terminate a session having a greatest amount of idle time.

* * * * *